(12) United States Patent
Roberts et al.

(10) Patent No.: US 9,010,502 B2
(45) Date of Patent: Apr. 21, 2015

(54) RETAINING FORMATION

(75) Inventors: Paul Roberts, Newport (GB); Keith Niehorster, South Glamorgan (GB); Martin P. Taylor, Torfaen (GB); V. S. Arul Anand, Karnataka (IN); Nagaraja Gargeshwari S, Karnataka (IN); Pradeep D. Mirji, Karnataka (IN); Herr Franz Helmut Holl, Mastershausen (DE)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 1445 days.

(21) Appl. No.: 12/342,588

(22) Filed: Dec. 23, 2008

(65) Prior Publication Data
US 2009/0175677 A1 Jul. 9, 2009

(30) Foreign Application Priority Data

Dec. 24, 2007 (GB) .................................. 0725225.7

(51) Int. Cl.
*F16D 55/08* (2006.01)
*F16C 11/06* (2006.01)
(Continued)

(52) U.S. Cl.
CPC ......... *F16C 11/0623* (2013.01); *F16D 2121/14* (2013.01); *F16D 2125/32* (2013.01); *F16D 2125/70* (2013.01)

(58) Field of Classification Search
USPC ....... 188/72.9, 73.34, 106 F, 206 R; 403/125, 403/143
See application file for complete search history.

(56) References Cited

U.S. PATENT DOCUMENTS 2,983,337 A 5/1961 Butler
3,410,372 A * 11/1968 Evans et al. .................. 188/71.9
(Continued)

FOREIGN PATENT DOCUMENTS

DE 10039160 2/2002
EP 1348882 10/2003
(Continued)

OTHER PUBLICATIONS

United Kingdom Search Report dated Mar. 29, 2008.
(Continued)

*Primary Examiner* — Thomas J Williams
*Assistant Examiner* — Mariano Sy
(74) *Attorney, Agent, or Firm* — Brooks Kushman P.C.

(57) ABSTRACT

A retaining formation defined on a brake lever of an air disc brake includes a push fit/snap fit connection for releasably securing a push rod to a brake lever. The retaining formation can include a pinned connection and a ball and socket joint, and a main axis of the pinned connection is coincident with a center of rotation of the ball and socket joint. The retaining formation can include a concave formation on one of the push rod and the brake lever and a corresponding convex formation on the other of the push rod and the brake lever. The concave formation at least partially surrounds the convex formation to prevent axial separation of the push rod and the brake lever. A method of assembling a brake subassembly includes the steps of assembling a push rod and a brake lever including a retaining formation such that at least a portion of the retaining formation deforms during assembly and resiles when the push rod is assembled to the brake lever to provide a snap fit connection therebetween. Another method of manufacturing a retaining formation includes the steps of providing one of a push rod and a brake lever with a concave formation, providing the other of the push rod and the brake lever with a convex formation able to receive the concave formation, assembling the concave formation and the convex formation, mechanically working the one of the push rod and the brake lever with the concave formation such that the concave formation at least partially surrounds the convex formation to prevent axial separation of the push rod and the brake lever.

17 Claims, 9 Drawing Sheets (51) Int. Cl.
*F16D 121/14* (2012.01)
*F16D 125/32* (2012.01)
*F16D 125/70* (2012.01)

(56) References Cited

U.S. PATENT DOCUMENTS

| | | | | |
|---|---|---|---|---|
| 4,109,765 | A | * | 8/1978 | Johannesen .................. 188/72.7 |
| 4,457,212 | A | * | 7/1984 | Unger et al. ....................... 92/18 |
| 4,766,980 | A | | 8/1988 | Engle |
| 4,819,996 | A | * | 4/1989 | Belart et al. ............... 303/114.3 |
| 5,515,949 | A | | 5/1996 | Baumgartner et al. |
| 5,547,048 | A | * | 8/1996 | Anthony ....................... 188/72.9 |
| 6,470,790 | B1 | * | 10/2002 | Hewitt ............................. 92/187 |
| 6,698,553 | B2 | * | 3/2004 | Varela .......................... 188/72.9 |
| 2004/0195051 | A1 | | 10/2004 | Heinlein |
| 2005/0175398 | A1 | | 8/2005 | Contero et al. |

FOREIGN PATENT DOCUMENTS

| | | |
|---|---|---|
| EP | 1433679 | 6/2004 |
| EP | 1440857 | 7/2004 |
| EP | 1431596 | 11/2005 |
| JP | 10196690 | 7/1998 |
| WO | 97/38883 | 10/1997 |

OTHER PUBLICATIONS

United Kindgom Search Report dated Jun. 13, 2008.
United Kingdom Search Report dated Jun. 13, 2008.

* cited by examiner

RETAINING FORMATION

REFERENCE TO RELATED APPLICATION

This application claims priority to United Kingdom Patent Application No. 0725225.7 filed Dec. 24, 2007.

BACKGROUND OF THE INVENTION

The present invention relates generally to a retaining formation for the connection of components in a brake. Specifically, the present invention relates to a retaining clip for the connection of a push rod in an actuator to a lever of an air disc brake.

It is known in brake applications to operate levers such as op-shafts and adaptors with push rods. The push rods act in compression when an actuating force is applied (e.g., by the activation of the brake) and transmit compressive forces in an actuation stroke, for example, between: an actuator and an op-shaft for actuation of a brake, an actuator and an adaptor lever for rotation of the adaptor lever, and an adaptor lever and an op-shaft for actuation of a brake.

The push rod then returns via a return stroke as air pressure is released and a return spring takes over. In brake applications, the return stroke occurs as a result of the actuating force being removed (e.g., by release of the brake by a driver) and additionally the lever providing a return force on the push rod (as most brakes provide a return mechanism to prevent the brake from remaining engaged).

Levers such as op-shafts and adaptor levers rotate in use. The end of the lever on which the push rod acts is positioned away from a pivot axis of the lever, and the contact point at which the push rod contacts the lever will tend to have a component of motion in a plane perpendicular to a main axis of the push rod.

If the push rod is to be attached to the lever, the end of the push rod that contacts the lever needs to be able to articulate in the plane perpendicular to the main axis of the push rod at the same time as the lever. This may be achieved by rotatably mounting the push rod about both ends, i.e., both at the contact point and at and end distant from the contact point. In the instance of an actuator push rod, the actuator lever itself may be rotatably mounted to achieve this.

The push rod may be rotatably mounted to the lever at the contact point by simply providing a socket on the lever and a ball on the end of the push rod. The push rod is constrained from movement away from the contact point on the lever (by the walls of the cup), but is able to slide rotationally providing the desired motion in use.

This solution is problematic, as in certain situations, the push rod can return before the lever. This may occur if, for example, the brake is operating in cold weather conditions. If the brake actuator is released, the brake push rod returns. However, the brake mechanism may be slow to respond due to the low temperature causing increased viscosity in the lubricant. The push rod and the lever can become disengaged and misaligned such that on a subsequent actuation stroke, the push rod either contacts the lever at the incorrect position, or does not contact it at all.

Alternatively, a pinned joint is known. A pin is then inserted through a corresponding series of bores in the lever and push rod to pin the push rod to the lever, allowing relative rotation about an axis parallel to a lever rotation axis. However, this arrangement requires modifications to the manufacture of both the lever and the push rod (i.e., the formation of the bores) and increases part count (in the need for a pin). The complexity and cost of assembly and servicing the brake is also increased due to the need to fit and remove the pin in a confined space.

Additionally, one of the corresponding bores is often of relatively large diameter compared to the pin to allow free movement of the push rod relative to the lever at the extreme ends of the range of motion of the lever. This may result in misalignment of the push rod and lever and jamming of the brake.

It is an aim of the present invention to overcome or at least mitigate one or more of these problems.

SUMMARY OF THE INVENTION

According to a first aspect of the invention, there is provided a retaining formation for retaining a push rod on a brake lever, the retaining formation including a pinned connection and a ball and socket joint. A main axis of the pinned connection is coincident with a center of rotation of the ball and socket joint. In one example, the retaining formation is part of a brake subassembly including a push rod and a brake lever, the brake subassembly being located in a transmission path from a brake actuator to a brake op-shaft. The brake lever may be a lever of an op-shaft or a lever of a brake adaptor.

Alternatively, or in addition, the pinned connection may include a pin defined in one of the push rod and the brake lever, and a bore defined in the other of the push rod and the brake lever, the bore receiving the pin. The pin and the bore are relatively sized to permit relative rotational movement of the push rod and the brake lever about a pivot axis transverse to a main axis of the pin. A pinned joint permits retention of the push rod against the lever in tension, and the ball and socket joint helps to mitigate misalignment between the components.

According to a further aspect of the present invention, there is provided a retaining formation defined on a brake lever of an air disc brake including a push fit/snap fit connection for releasably securing a push rod to a brake lever. The push rod may be retained against the lever, and no separation will be seen in use as the lever can exert a tension force on the push rod to return it to its initial position. The snap fit feature allows for ease of assembly and servicing.

In one example, the formation includes a resilient clip having a substantially U-shaped member to at least partially surround a brake lever. In one example, each arm of the substantially U-shaped member includes an orifice configured to receive a projecting pin of a push rod. In one example, an arm of the U-shaped member includes an outwardly projecting lip at a free end to guide the push rod into the U-shaped member.

Alternatively, the resilient clip may include a substantially hollow cuboid having an open face to receive a lever. Alternatively, the substantially hollow cuboid has an orifice defined in a sidewall to receive at least a part of a push rod, the orifice positioned to be proximate a recess in a brake lever for receiving a push rod in use such that assembly of the push rod into the recess prevents removal of the resilient clip from a brake lever. In one example, the push rod includes a pair of opposed, co-axial projecting pins projecting from a first end thereof for engagement with the orifices in use to form the snap fit.

According to a still further aspect of the present invention, there is provided a retaining formation for retaining a push rod on a brake lever, the retaining formation including a concave formation on one of the push rod and the brake lever and a corresponding convex formation on the other of the push rod and the brake lever. The concave formation at least partially surrounds the convex formation to prevent axial separation of the push rod and the brake lever.

According to a yet still further aspect of the present invention, there is provided a method of assembling a brake subassembly including the steps of providing a brake lever including a retaining formation as described above, assembling a push rod and the brake lever such that at least a portion of the retaining formation deforms during assembly and resiles when the push rod is assembled to the brake lever to provide a snap fit connection therebetween.

According to another aspect of the present invention, there is provided a method of manufacturing a retaining formation as above including the steps of providing one of a push rod and a brake lever with a concave formation, providing the other of the push rod and the brake lever with a convex formation able to receive the concave formation, assembling the concave and the convex formation, mechanically working the one of the push rod and the brake lever with the concave formation such that the concave formation at least partially surrounds the convex formation to prevent axial separation of the push rod and the brake lever. The step of mechanically working may include the step of peening.

In this manner, the potential problems caused by separation of the push rod and the lever are alleviated.

BRIEF DESCRIPTION OF THE DRAWINGS

An example of a retaining clip in accordance with the present invention will now be described with reference to the accompanying Figures, in which.

DETAILED DESCRIPTION OF THE PREFERRED EMBODIMENT

Figure 1:
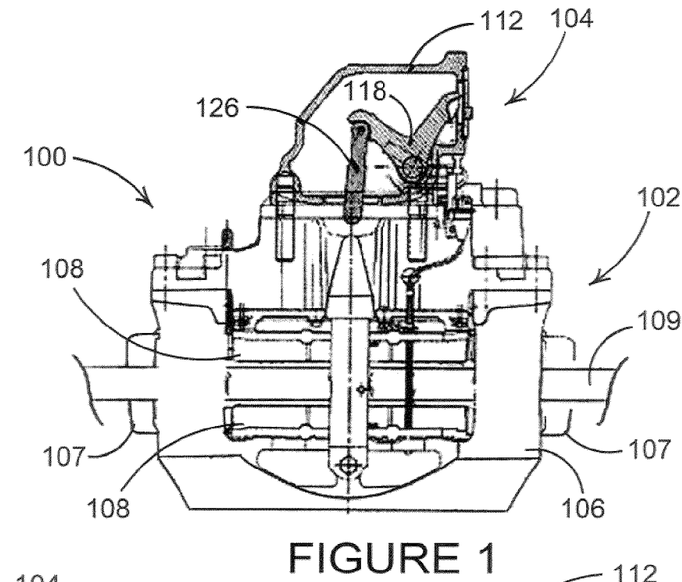
FIG. 1 is a partial section view of a brake assembly incorporating an adaptor subassembly according to a first aspect of the present invention.

A brake assembly 100 is shown in FIG. 1. The brake assembly 100 includes a brake subassembly 102 and an adaptor box subassembly 104. The brake subassembly 102 includes a brake caliper 106 slidably mounted with respect to a brake carrier 107 and a pair of opposed brake pads 108 for actuation and engagement with a brake disc or rotor 109 to provide a braking force for retarding rotation of a wheel (not shown) of a vehicle (not shown). The basic layout and purpose of an adaptor box is shown in our earlier application EP1348882.

The brake pads 108 are pushed into engagement with the brake disc or rotor 109 via an op-shaft 110 of the brake subassembly 102 (see FIG. 2) via an actuation force in a direction A. The op-shaft 110 converts a relatively high displacement, low force input from an air actuator into a low displacement, high force output to the brake pads 108 in a known manner.

The adaptor box subassembly 104 includes an adaptor box housing 112, an adaptor subassembly 114, and an attachment feature 116 to attach the adaptor box housing 112 to the brake subassembly 102. The adaptor box subassembly 104 allows an air actuator to be positioned with its main axis at an angle to the direction of force applied to the op-shaft 110. This is achieved via a pivotable lever as will be described below.

Figure 3:
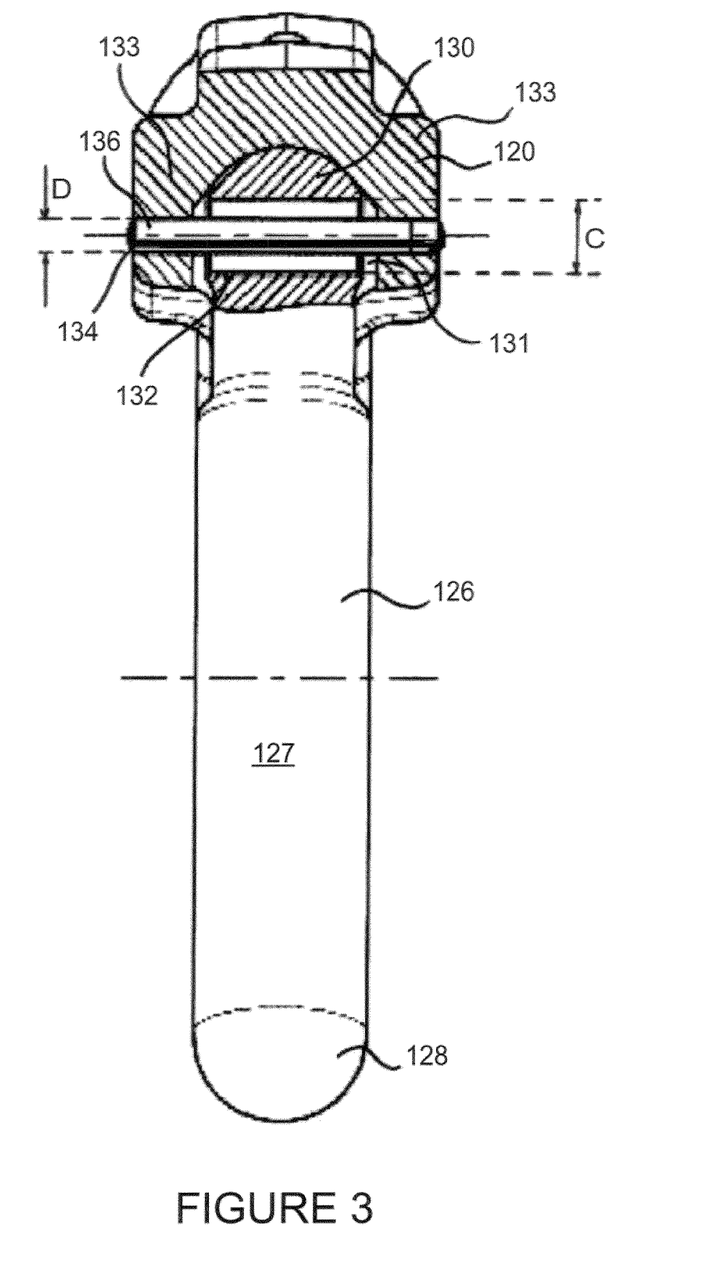
FIG. 3 is a section view along line III-III of FIG. 2.

The adaptor subassembly 114 includes an adaptor lever 118 with a first arm 120 and a second arm 122 radially projecting from a pivot axis B, with an angular spacing of approximately 90 degrees between them. The adaptor lever 118 defines a bore 124 through which a pin 125 is inserted and fixed to the adaptor box housing 112. With reference to FIG. 3, a distal end of the first arm 120 includes a recess 131 flanked by a pair of sidewalls 133. A pair of bores 134 are defined through a distal end of the first arm 120 through both the pair of sidewalls 133. Each of the pair of bores 134 have a diameter D.

Figure 2:
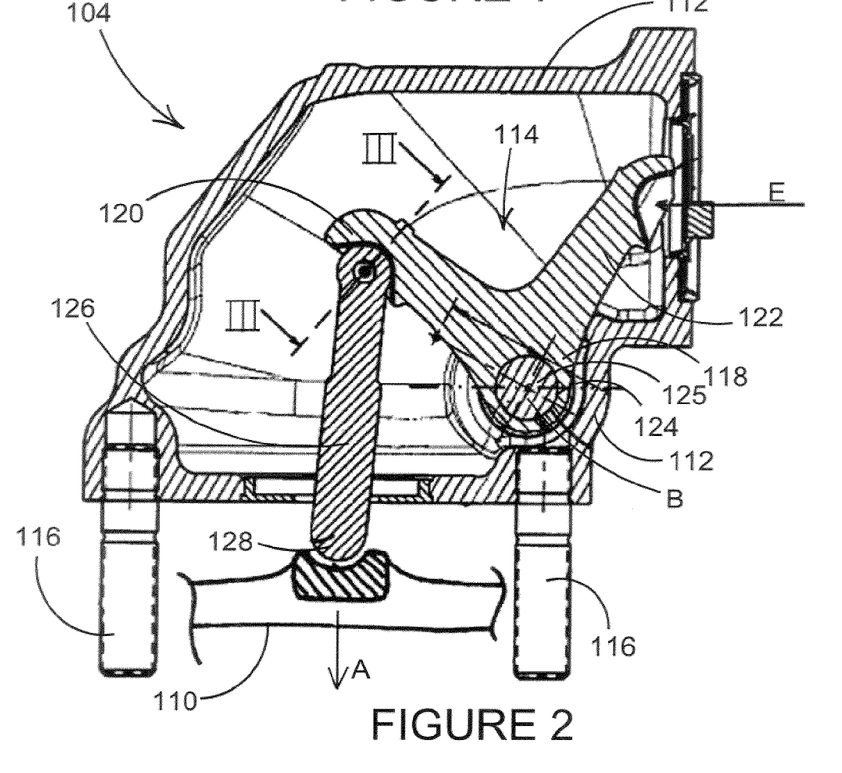
FIG. 2 is a section view of a part of the brake assembly of FIG. 1.

The adaptor box subassembly 104 also includes a push rod 126. The push rod 126 has an elongate cylindrical body 127 with a generally hemispherical first end 128 and a generally hemispherical second end 130, as can be seen in FIGS. 2 and 3. The hemispherical second end 130 has a bore 132 defined therethrough of a diameter C. The adaptor box subassembly 104 also includes a pin 136, as will be described below.

When assembled, the adaptor lever 118 is rotatably mounted on the pin 125 to rotate about the pivot axis B. The hemispherical second end 130 of the push rod 126 is inserted into the recess 131 such that the pair of bores 134 and the bore 132 are coaxial. The pin 136 is then inserted through the assembled push rod 126 and the adaptor lever 118, as shown in FIG. 3. The pin 136 is sized to be of slightly larger diameter than the diameter D, thus providing an interference fit and retaining the pin 136 in place. The pin 136 may be a roll pin. The hemispherical first end 128 of the push rod 126 is located in a recess on the op-shaft 110.

In use, a brake actuation force E is applied (by an air actuator or similar) to the second arm 122 of the adaptor lever 118, as shown in FIG. 2. This causes counter-clockwise (as shown in FIG. 2) rotation of the adaptor lever 118 about the pivot axis B. This in turn pushes the push rod 126 in the direction A against the op-shaft 110 to provide braking force.

The coexistence of the pin 136 joint and the recess 131 provides retention between the push rod 126 and the adaptor lever 118 in addition to permitting stable sliding rotation in use. Misalignment of the push rod 126 and the adaptor lever 118 is therefore made less likely.

The motion of the push rod 126 is not entirely axial (i.e., not entirely in the direction A). Rather, due to the rotation of the adaptor lever 118, some articulation in the direction of actuation force E is also observed. This movement is accounted for by the ability of the push rod 126 to rotate about the pin 136 mounted in the adaptor lever 118 and rotate in the recess provided on the op-shaft 110.

Additionally, some movement is experienced in the direction of the pivot axis B at the first end 128 due to the rotation of the op-shaft 110. To account for this, the bore 132 is made of a significantly larger diameter than the pin 136 to allow rotation of the push rod 126 in the plane of FIG. 3; i.e., about a tilt axis. The tilt axis is generally transverse to the pin 136. In the example, the tilt axis (when viewing FIG. 2) is parallel to the brake actuation direction E, but passing through the pin 136. When viewing FIG. 3, the tilt axis is perpendicular to the plane of the page and passes through the pin 136. The degree of freedom of rotation of the push rod 126 about the tilt axis may be controlled by the relative diameters of the pin 136 and the bore 132. In the example, the push rod 126 can rotate ±4 degrees relative to the first arm 120, as this has been found to be sufficient to account for tilting due to normal motion of the op-shaft 110. Even though such movement is permitted, the pin 136 continues to retain the push rod 126 relative to the adaptor lever 118.

Forming the recess 131, the pair of sidewalls 133, the pair of bores 134 and the bore 132 is evidently more complex, and hence time consuming and expensive than forming a simple ball and socket joint (e.g., the joint between the push rod 126 and the op-shaft 110). Furthermore, an extra assembly operation of inserting the pin 136 is required. Additionally, it is necessary to assemble the push rod 126 onto the adaptor lever 118 prior to mounting the adaptor lever 118 in the adaptor box housing 112, which reduces the flexibility of the assembly process and hence may be undesirable.

The pin 136 can move in the large diameter bore 132, and as such the push rod 126 has a large range of movement relative to the adaptor lever 118. In the event that extreme cold weather hinders the op-shaft 110 from returning with the push rod 126 (FIG. 2 shows the op-shaft 110 and the push rod 126 beginning to disconnect), the op-shaft 110 and the push rod 126 become disconnected and may not relocate properly due to the significant permitted range of movement of the push rod 126.

Figures 4, 5:
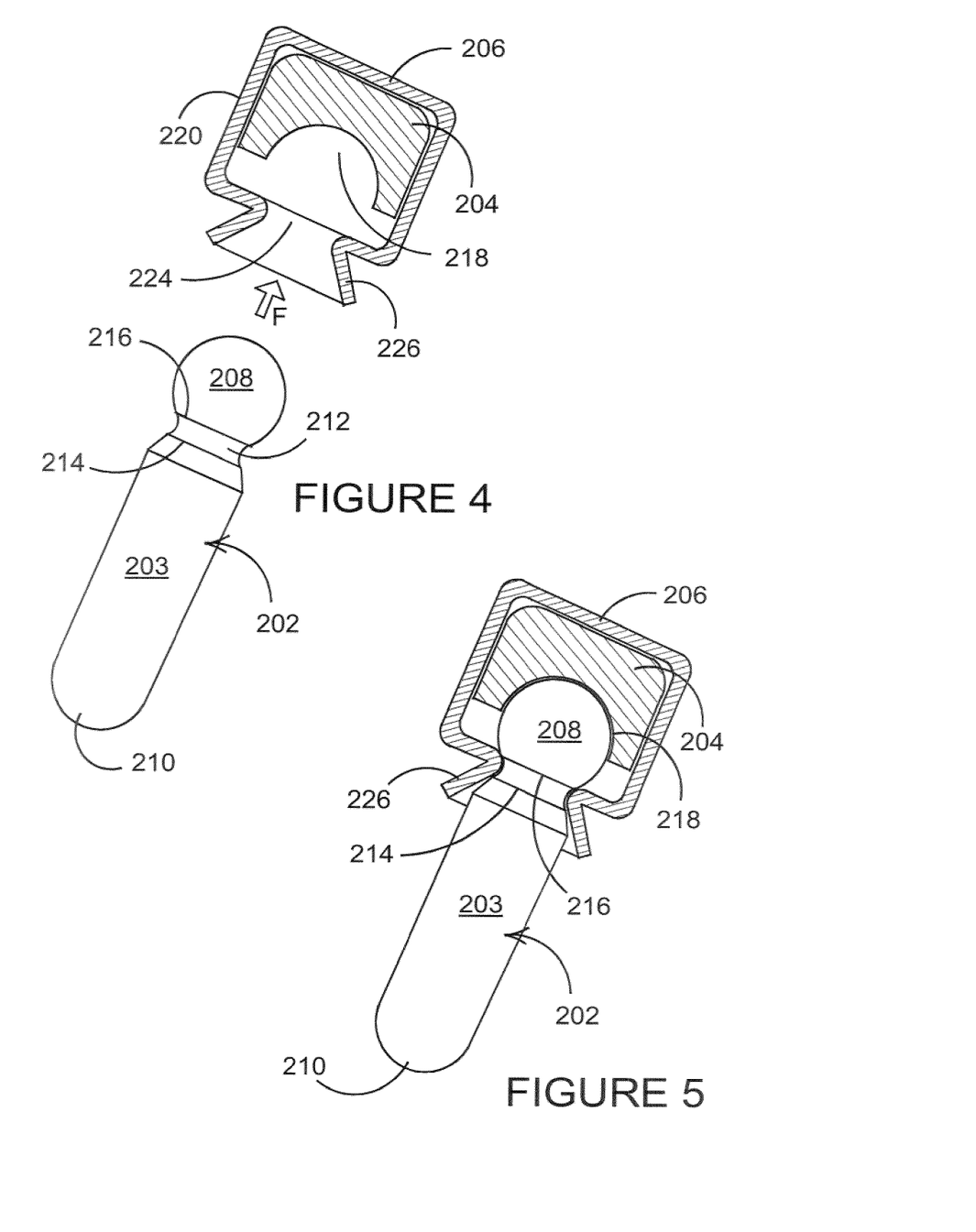
FIG. 4 is a partial section view of an adaptor subassembly and a retaining clip according to a second aspect of the present invention.
FIG. 5 is a partial section view of the adaptor subassembly and the retaining clip of FIG. 4 in an assembled condition.
Figures 6, 7, 8:
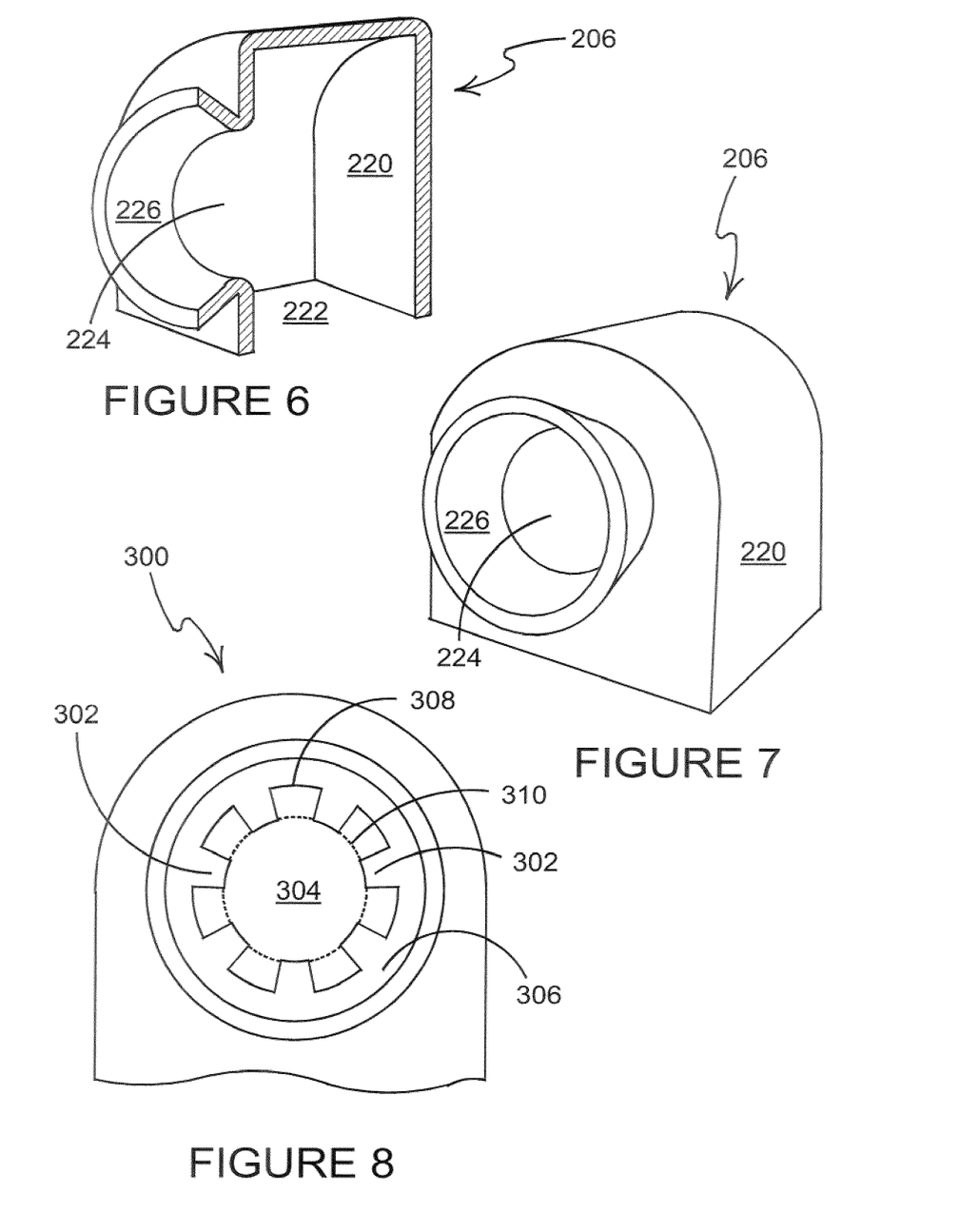
FIG. 6 is a perspective section view of the retaining clip of FIG. 4.
FIG. 7 is a perspective view of the retaining clip of FIG. 4.
FIG. 8 is an end view of a third embodiment of a retaining clip in accordance with the present invention.

FIGS. 4 and 5 show a push rod 202, the head 204 of an adaptor lever and a retaining clip 206 in accordance with a second embodiment of the present invention. FIGS. 6 and 7 show the retaining clip 206 in isolation.

The push rod 202 has a generally cylindrical body 203 with first and second hemispherical ends 208 and 210, respectively. The second hemispherical end 210 is adapted to mate with an op-shaft, as shown in FIGS. 1 to 3. A circumferential neck 212 is defined on the push rod 202 proximate the first hemispherical end 208 delimited by a first shoulder 214 and a second shoulder 216. The head 204 is generally rectangular in section, and defines a hemispherical recess 218.

The retaining clip 206 includes a generally cuboidal body 220. The generally cuboidal body 220 is preferably shaped to conform to the profile of the head 204. One wall of the generally cuboidal body 220 is open to define an opening 222. A further wall of the generally cuboidal body 220 adjacent to the opening 222 defines a circular mouth 224, the periphery of which is coincident with a smaller diameter end of a frustroconical projection 226, which projects outwardly from the generally cuboidal body 220. The diameter of the circular mouth 224 is sized to be less than the diameter of the generally cylindrical body 203 of the push rod 202, but greater than the diameter of the circumferential neck 212.

The retaining clip 206 is constructed from a resilient material, such as plastics material, or sheet metal material. The retaining clip 206 is preferably molded in the case of a plastics material, or sheet metal formed in the case of sheet metal material.

To use the retaining clip 206, the retainer clip 206 is placed over the head 204 by inserting the head 204 into the opening 222 such that the circular mouth 224 is adjacent to the hemispherical recess 218 in the head 204, as shown in FIG. 4. The first hemispherical end 208 of the push rod 202 is then inserted in a direction F into the frustroconical projection 226. As the diameter of the circular mouth 224 is sized to be less than the diameter of the generally cylindrical body 203, the retaining clip 206 deforms to allow the first hemispherical end 208 to pass through the circular mouth 224. The circular mouth 224 then resiles back to its original diameter once the push rod 202 has been inserted sufficiently that the circumferential neck 212 is coincident with the circular mouth 224. During this operation, the frustroconical projection 226 acts as a guide to guide the push rod 202 towards the circular mouth 224 and hence the hemispherical recess 218. The frustroconical projection 226 also reduces the amount of free movement of the push rod 202 should it lose contact with the op-shaft at the second hemispherical end 210. The sides of the frustrocone reduce the amount that the push rod 202 can rotate about the head 204 as the generally cylindrical body 203 will abut them.

The push rod 202 has been inserted sufficiently once the hemispherical head 208 mates with the hemispherical recess 218, as shown in FIG. 5. In use, the push rod 202 can rotate relative to the head 204. Rotation of the push rod 202 is permitted due to the difference in diameters between the circular mouth 224 and the circumferential neck 212. Alternatively, or additionally, the circular mouth 224 may be a relatively tight fit around the circumferential neck 212 with rotation being permitted due to the resilient nature of the retaining clip 206.

The head 204 may be of any relevant lever in a brake assembly. For example, it may be the head of an adaptor lever (as shown), or the head of an op-shaft. Equally, the push rod 202 may be the push rod of an actuator or an adaptor. Thus, in other embodiments, the push rod 202 may have the circumferential neck 212 at both the first and second hemispherical ends 208 and 210, respectively, to be releasably secured to both an adaptor lever and an op-shaft lever.

The push rod 202 can be disassembled from the head 204 by axially pulling it with sufficient force to widen the circular mouth 224 to pass over the hemispherical head 208. The force required to disassemble the push rod 202 from the head 204 is significantly higher than the tension forces that the joint between the two will experience in use, thus making it extremely difficult for the components to become separated accidentally.

FIG. 8 shows part of an alternative retaining clip 300 substantially similar to the retaining clip 206, but with projecting fingers 302 spaced circumferentially around an orifice 304 at the base of a frustroconical projection 306. An orifice outer periphery 308 has a diameter larger than a push rod cylindrical portion diameter (not shown), whereas an inner periphery 310 defined by distal ends of the projecting fingers 302 has a diameter less than the push rod cylindrical portion diameter. As such, the projecting fingers 302 must resile to allow insertion of a push rod (substantially similar to the push rod 202).

Figure 9:
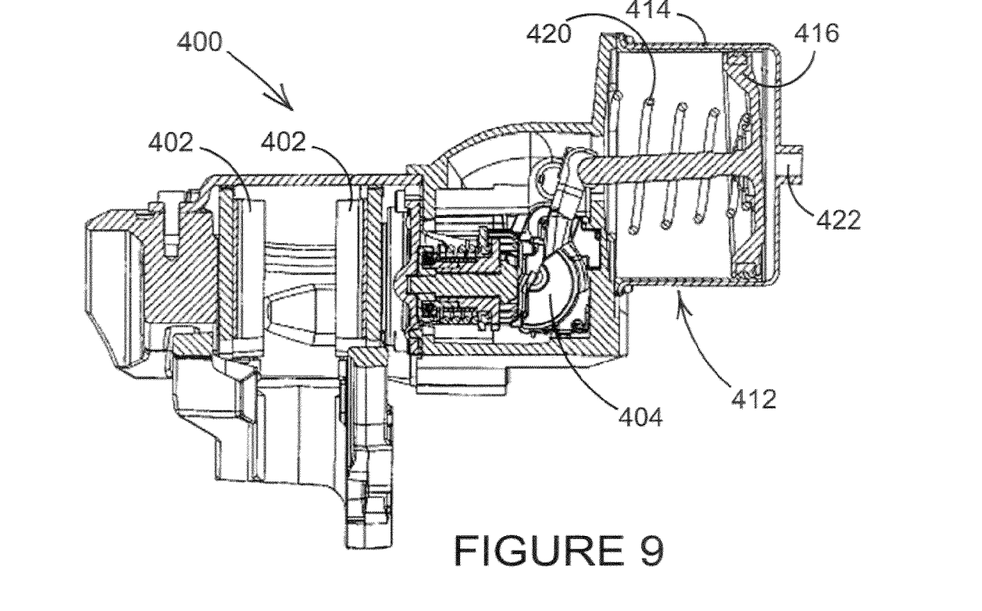
FIG. 9 is a side section view of a brake assembly including a retaining clip according to a fourth embodiment of the present invention.
Figure 10:
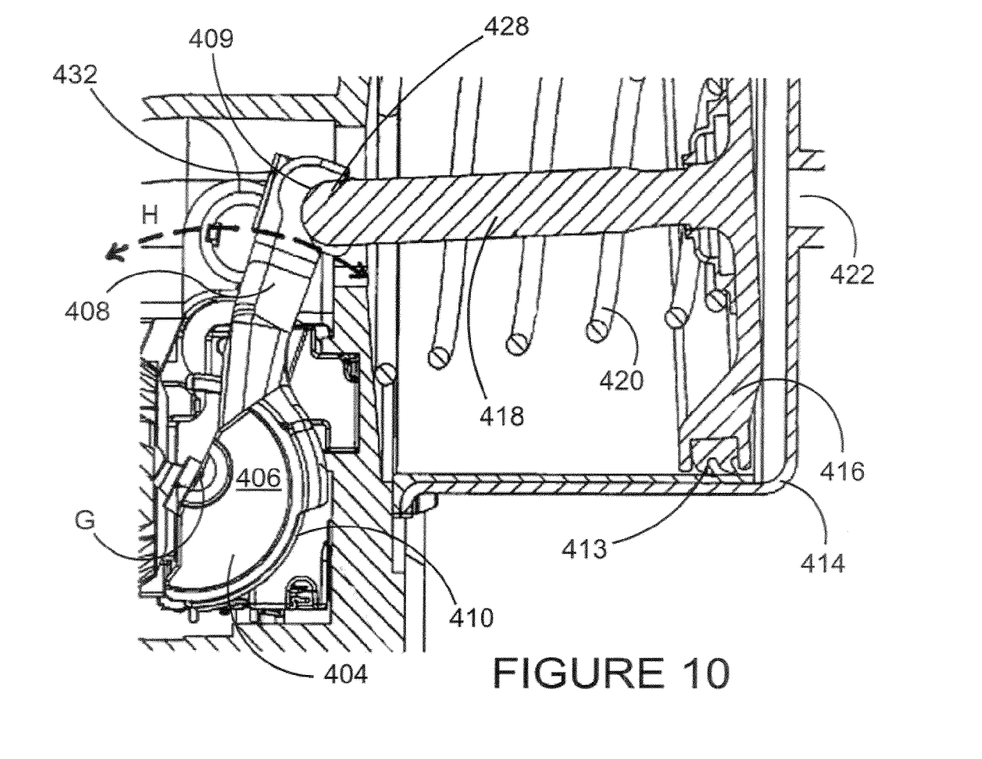
FIG. 10 is a side section view of a part of the brake assembly of FIG. 9.
Figure 11:
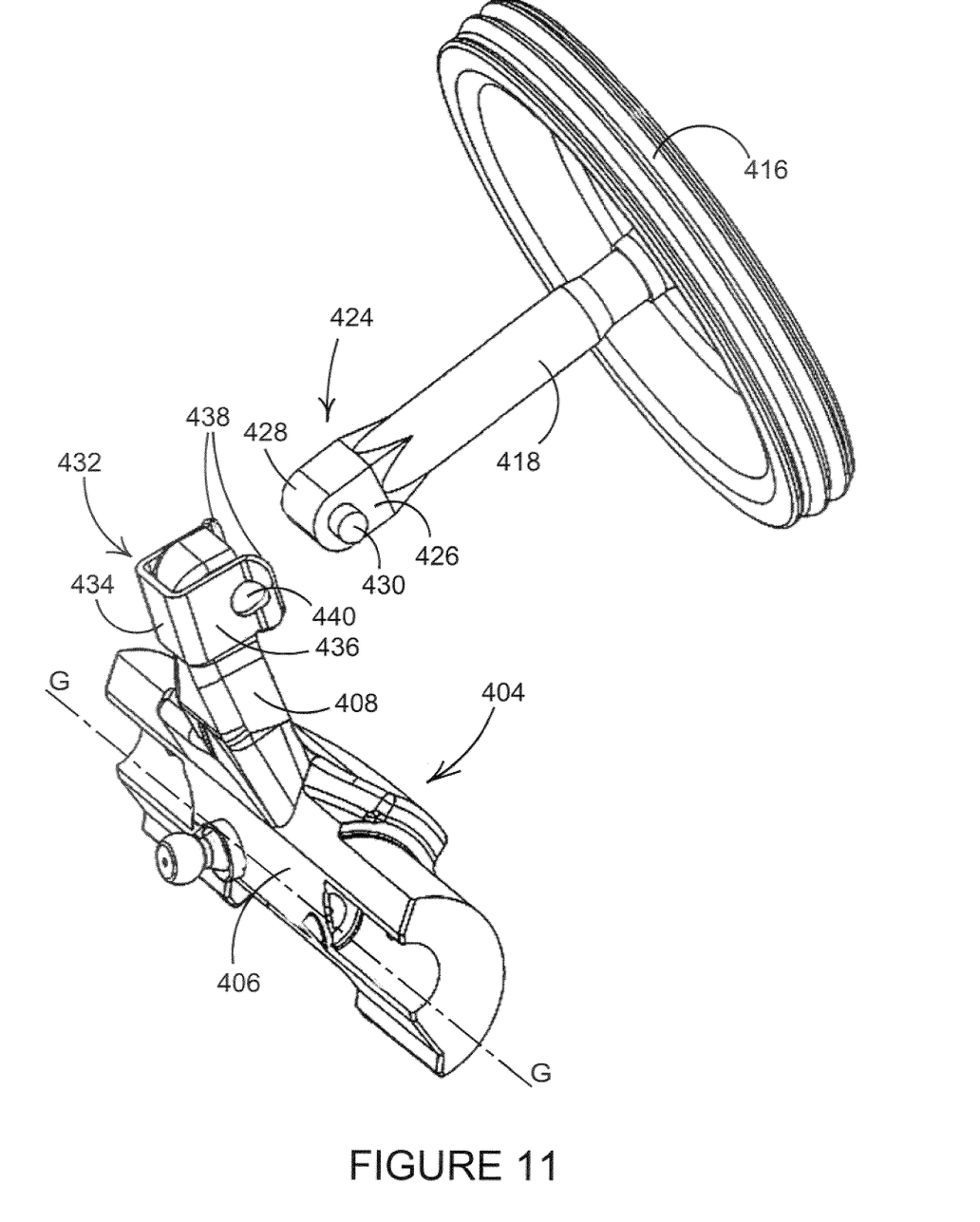
FIG. 11 is a perspective view of a part of the brake assembly of FIG. 9.
Figure 12:
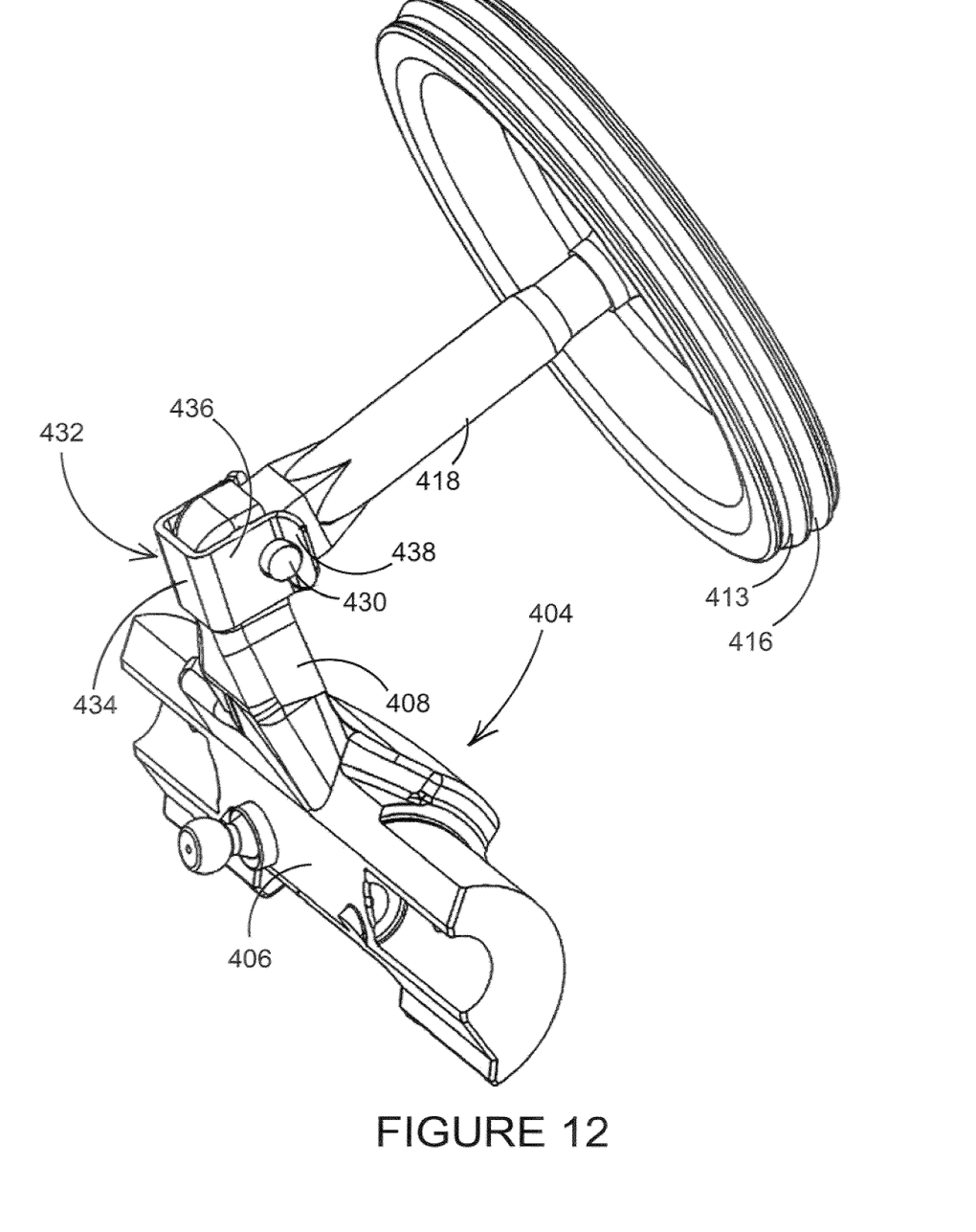
FIG. 12 is a perspective view of a part of the brake assembly of FIG. 9 in an assembled condition.

FIG. 9 shows a brake assembly 400 including a pair of opposed brake pads 402 configured to be moved together to clamp a disc or rotor (not shown) by counter-clockwise rotation of an op-shaft 404 (best viewed in FIGS. 10 to 12).

The op-shaft 404 includes a body portion 406 and a lever arm 408 projecting radially outwardly therefrom. The op shaft 404 is carried on needle roller bearings 410 to rotate about an axis G to actuate the brake in a known manner. The end of the lever arm 408 describes a circular path H (see FIG. 10) in use. The lever arm 408 has a cylindrical socket formation 409 defined at its distal end, with the main axis of the cylindrical socket formation 409 being parallel to the axis G.

The brake assembly 400 further includes an air actuator 412 having an actuator housing 414 with a piston 416 disposed therein. The piston 416 is connected to a push rod 418. The air actuator 412 further includes a return spring 420 positioned between the actuator housing 414 and the piston 416 to return the piston to the position shown in FIG. 9 following actuation. The air actuator 412 is configured to allow a small amount of rotational movement of the push rod 418, either by use of a flexible seal 413, or alternatively by inclusion of a rotational joint (not shown) connecting the push rod 418 to the piston 416.

The distal end of the push rod 418 includes a foot 424 having a generally cuboidal body 426 and a cylindrical end 428. A pair of opposing pins 430 (shown in FIG. 11) extend coaxially from the foot 424.

The brake assembly 400 further includes a retaining clip 432. The retaining clip 432 includes a substantially U-shaped sheet formation having a back 434 connected to two parallel opposing sidewalls 436. A pair of mutually divergent lips 438 are defined on free ends of the two parallel opposing sidewalls 436 and extend outwardly. A bore 440 is defined in each of the two parallel opposing sidewalls 436. The bores 440 are co-axial.

The retaining clip 432 is constructed from a resilient material, such as plastics material or sheet metal material. The retaining clip 432 is preferably molded in the case of a plastics material, or sheet metal formed in the case of sheet metal material.

To assemble the brake assembly 400, the cylindrical end 428 of the push rod 418 is inserted into the cylindrical socket formation 409, as shown in FIG. 10. The retaining clip 432 is then pushed over the assembled push rod 418 and the op-shaft 404 from a direction opposite to the direction of insertion of the push rod 418. The back 434 of the retaining clip 432 abuts the lever arm 408.

As the retaining clip 432 is pushed, the pair of mutually divergent lips 438 contact the pair of opposing pins 430 and slide such that the two parallel opposing sidewalls 436 spread. As the bores 440 come into engagement with the pair of opposing pins 430, the two parallel opposing sidewalls 436 resile to the position shown in FIG. 12. The retaining clip 432 is a "snap fit" component. Alternatively, the retaining clip 432 is secured to the op-shaft 404, e.g. by welding or adhesive prior to inserting the push rod 418, which may be advantageous during assembly.

Actuation of the air actuator 412 occurs by the supply of compressed air to an inlet 422 formed in the actuator housing 414. The piston 416 is then actuated to the left in FIG. 9 such that the push rod 418 extends from the actuator housing 414. The motion of the push rod 418 causes the op-shaft 404 to rotate about the axis G and activate the brake. As the op-shaft 404 rotates and describes the circular path H, the flexible seal 413 and the rotational joint formed by the interaction of the pair of opposing pins 430 and bores 440 allow rotational movement of the push rod 418. Therefore, the component of motion of the end of the op-shaft 404 perpendicular to the direction of motion of the push rod 418 is accounted for.

Without the retaining clip 432, the push rod 418 and the op-shaft 404 can easily become separated. Once air is no longer supplied to the inlet 422, the return spring 420 returns the piston to the position shown in FIG. 9. In normal working conditions, the end of the op-shaft 404 will return with the push rod 418 as the braking forces act to disengage the brake. However, in extreme cold conditions, the brake mechanism may become stiff, and the op-shaft 404 may return at a slower rate than the push rod 418. Without the retaining clip 432, this may cause disengagement and misalignment of the two components.

The retaining clip 432 acts to retain the push rod 418 against the op-shaft 404 and prevent such disengagement while still allowing rotational motion. This results from the engagement of the pair of opposing pins 430 with the bores 440.

The "snap-fit" nature of the retaining clip 432 simplifies the assembly process over the pin 136. In other embodiments, an attachment may be provided to retain the retaining clip 432 on the op-shaft 404. For example, a bolt may be provided to attach the back 434 to the lever arm 408. Alternatively, the retaining clip 432 may be configured to surround the end of the lever arm 408 like the retaining clip 206.

Figure 13:
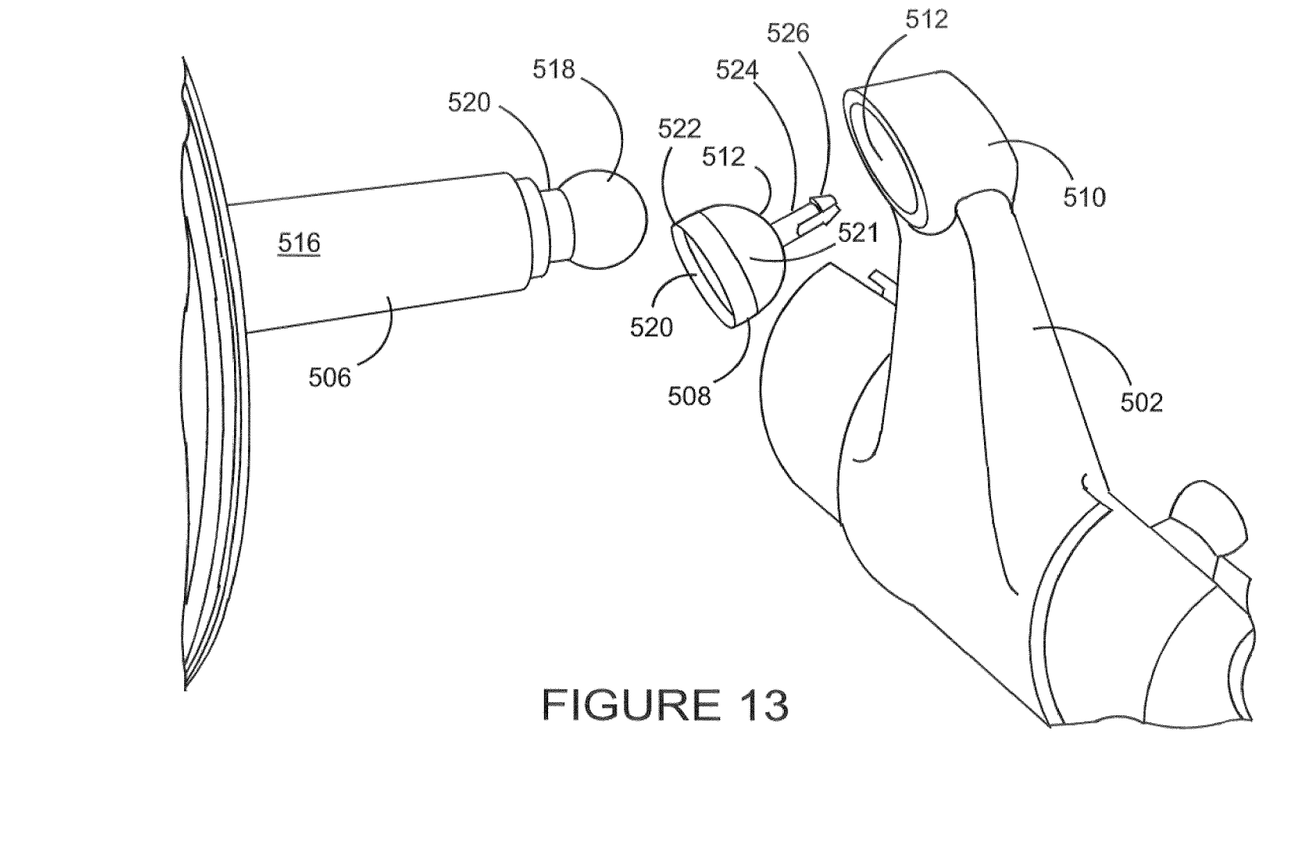
FIG. 13 is a perspective view of a brake assembly including a retaining clip according to a fifth embodiment of the present invention.
Figure 14:
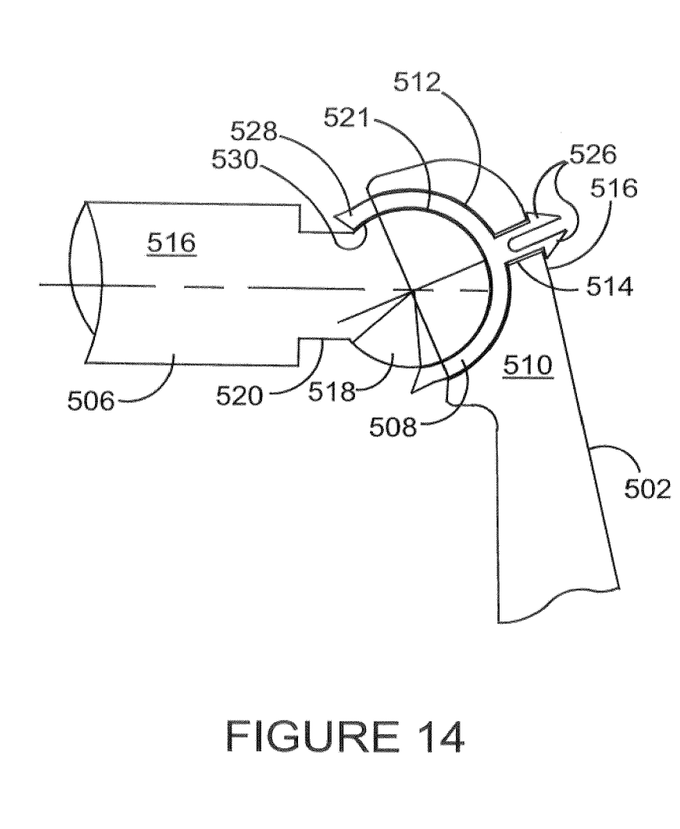
FIG. 14 is a side section view of a part of the brake assembly of FIG. 13 in a brakes-off condition.
Figure 15:
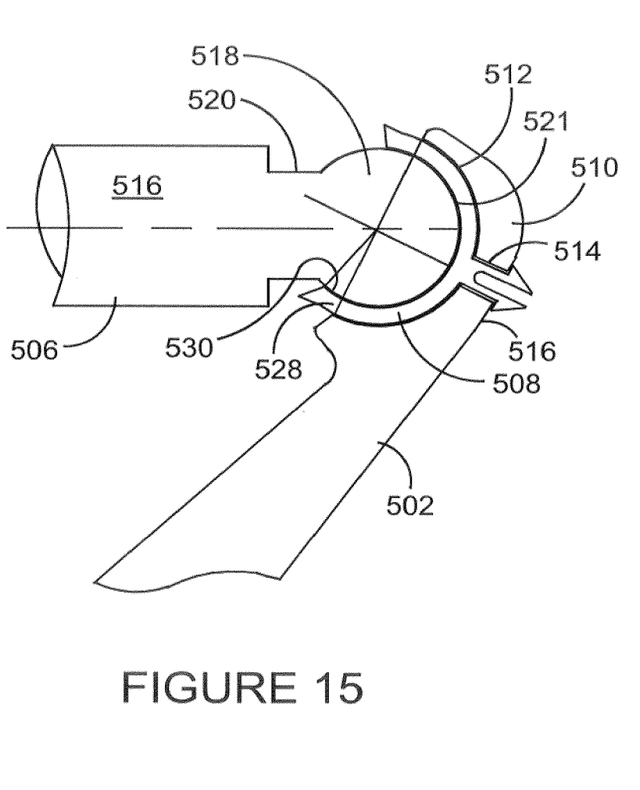
FIG. 15 is a side section view of a part of the brake assembly of FIG. 13 in a brakes-on condition.

FIGS. 13 to 15 show an op-shaft 502, a piston 504 and a push rod 506 of a brake assembly 500 substantially similar to the corresponding components of the brake assembly 400. In addition, the brake assembly 500 includes a retaining clip 508.

The op-shaft 502 includes a head 510 with a hemispherical recess 512. A bore 514 extends from the hemispherical recess 512 to a rear face 516 of the head 510.

The push rod 506 includes a cylindrical portion 516 and a spherical head 518. A neck 520 is disposed between the cylindrical portion 516 and the spherical head 518. The neck 520 is substantially circular in cross-section and of a smaller diameter than the cylindrical portion 516 and the spherical head 518.

The retaining clip 508 includes a cup-shaped hollow body 521 and defines an orifice 522 over less than half of the surface of the neck 520. An arm 524 extends from the cup-shaped hollow body 521 and is opposed from the orifice 522. The arm 524 includes a pair of barbed projections 526 with a slit defined therebetween.

In one example, the retaining clip 508 is constructed from engineering plastics material and is resilient. In other embodiments, the retaining clip 508 may be overmolded onto the op-shaft 502 to hold it in place rather than being secured by arm 524 to the op-shaft 502.

In use, the retaining clip 508 is secured to the head 510 by inserting the arm 524 into the bore 514. The retaining clip 508 can then be pushed home such that the barbed struts resile to their normal position and secure the retaining clip 508 in the hemispherical recess 512 as shown in FIGS. 14 and 15. In other embodiments, the retaining clip 508 may be overmolded onto the op-shaft 502 to hold it in place rather than being secured by arm 524 to the op-shaft 502.

The push rod 506 is secured to the retaining clip 508 by inserting the spherical head 518 into the orifice 522. The diameter of the spherical head 518 is slightly smaller than the diameter of the inner surface of the cup-shaped hollow body 521, but larger than the diameter of the orifice 522. The cup-shaped hollow body 521 deforms upon insertion of the spherical head 518 and resiles to surround the spherical head 518 as shown in FIGS. 14 and 15.

The assembly sequence may be in either order, with the retainer clip 508 either being assembled to the op-shaft or the push rod first. In one example, the retainer clip 508 is assembled to the op-shaft first because the spherical head 518 and the cup-shaped hollow body 521 can be aligned in a number of relative positions and as such is easier than the alignment of the retaining clip 508 and the head 510, which can only be aligned in a single position. This is advantageous as the assembly may have to take place within e.g., an adaptor box where visibility and the ability to maneuver the components are low. As can be seen in FIGS. 14 and 15, the hemispherical recess 512 is hemispherical to allow the cup-shaped hollow body 521 to deform upon insertion of the spherical head 518.

In use, the spherical head 518 can rotate in the retaining clip 508, but is translationally retained by the fact that the cup-shaped hollow body 521 defines a portion of a sphere larger than a hemisphere. The abutment between a part 528 of the cup-shaped hollow body 521 proximate the orifice 522 and a part 530 of the spherical head 518 proximate the neck 520 ensures that translational motion is constrained.

In an alternative embodiment, a cup-shaped recess may be provided in a lever, the push rod end inserted, and the lever subsequently formed to retain the push rod end, for example, by mechanically deforming the lever. This mechanical deformation may take place using peening.

The embodiments shown in FIGS. 4 to 15 secure a push rod to a lever arm via a "snap fit." The term "snap fit" is intended to cover connections in which a resilient body deforms during and/or after the assembly process to inhibit subsequent unintentional disassembly (by requiring a predetermined degree of force to disassemble). It should be noted that the "snap fit" enables simple disassembly, although that force required to part the retaining clip and the push rod or lever is substantially higher than the force required to fulfil the function of retaining the components together in use. Additionally, it should be noted that adaptor levers may define a range of angles between the first and second arms, ranging from 0 to 180 degrees.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A brake subassembly comprising:
   a push rod;
   a brake lever;
   a retaining formation connecting the push rod and the brake lever, the retaining formation comprising a pinned connection and a ball and socket joint, wherein a main axis of the pinned connection is substantially coincident with a center of rotation of the ball and socket joint, and the brake subassembly is located in a transmission path from a brake actuator to a brake op-shaft; and
   wherein the pinned connection comprises a pin defined in one of the push rod and the brake lever and a bore defined in the other of the push rod and the brake lever, the bore receiving the pin, and the pin and the bore are relatively sized to permit relative rotational movement of the push rod and the brake lever about a pivot axis transverse to the main axis of the pin.

2. The brake subassembly according to claim 1 wherein the pin and the bore are relatively sized to permit a maximum relative rotational movement of approximately ±4 degrees.

3. The brake subassembly according to claim 1 wherein the ball and socket joint comprises a cup formation defined on the brake lever and a ball formation defined on the push rod.

4. The brake subassembly according to claim 1 wherein the brake lever includes a first arm and a second arm radially projecting from a lever pivot axis, and wherein the second arm is configured to receive a brake input force and the first arm is coupled to the push rod with the pinned connection.

5. The brake subassembly according to claim 4 wherein the first and second arms have an angular spacing of approximately ninety degrees.

6. The brake subassembly according to claim 4 wherein a distal end of the first arm includes a recess with a pair of sidewalls that include lever bores having a first diameter, and wherein the push rod includes a rod bore defined by a second diameter greater than the first diameter, the pin being received within the lever and rod bores.

7. The brake subassembly according to claim 6 wherein the pin is defined by a third diameter that is less than the first diameter.

8. The brake subassembly according to claim 6, wherein the main axis of the pin is defined along a length of the pin, and wherein the pivot axis comprises a tilt axis that is transverse to the main axis.

9. The brake subassembly according to claim 8 wherein the tilt axis is generally parallel to a brake actuation direction of the application of the brake input force.

10. A brake subassembly comprising:
    a push rod;
    a brake lever;
    a retaining formation for retaining the push rod on the brake lever, the retaining formation comprising a concave formation on one of the push rod and brake lever and a corresponding convex formation on the other of the push rod and the brake lever, wherein the concave formation at least partially surrounds the convex formation to prevent axial separation of the push rod and the brake lever, and the brake subassembly is located in a transmission path from a brake actuator to a brake op-shaft; and
    wherein the retaining formation comprises a pinned connection and a ball and socket joint, wherein a main axis of the pinned connection is substantially coincident with a center of rotation of the ball and socket joint, and wherein the pinned connection comprises a pin defined in one of the push rod and the brake lever and a bore defined in the other of the push rod and the brake lever, the bore receiving the pin, and the pin and the bore are relatively sized to permit relative rotational movement of the push rod and the brake lever about a pivot axis transverse to the main axis of the pin.

11. The brake subassembly according to claim 10 wherein the retaining formation comprises a snap-fit component defining the concave formation for receiving the convex formation as a snap-fit, the snap-fit component comprises an attachment formation for attachment to the one of the push rod and brake lever, and the snap-fit component is arranged such that the concave formation receives the convex formation when attached in situ on the one of the push rod and the brake lever.

12. The brake subassembly according to claim 10 wherein the concave formation and the convex formation are substantially spherical.

13. The brake subassembly according to claim 10 wherein the brake lever includes a first arm and a second arm radially projecting from a lever pivot axis and being angularly spaced apart from each other by approximately ninety degrees, and wherein the second arm is configured to receive a brake input force and the first arm is coupled to the push rod with the pinned connection.

14. The brake subassembly according to claim 13 wherein a distal end of the first arm includes a recess with a pair of sidewalls that include lever bores having a first diameter, and wherein the push rod includes a rod bore defined by a second diameter greater than the first diameter, the pin being received within the lever and rod bores.

15. The brake subassembly according to claim 14 wherein the pin is defined by a third diameter that is less than the first diameter.

16. The brake subassembly according to claim 13, wherein the main axis of the pin is defined along a length of the pin, and wherein the pivot axis comprises a tilt axis that is transverse to the main axis.

17. The brake subassembly according to claim 16 wherein the tilt axis is generally parallel to a brake actuation direction of the application of the brake input force.

\* \* \* \* \*